United States Patent
Watanabe et al.

(10) Patent No.: US 8,690,058 B2
(45) Date of Patent: Apr. 8, 2014

(54) CARD READER

(75) Inventors: Takeki Watanabe, Nagano (JP); Koji Oguchi, Nagano (JP); Toshio Tatai, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 13/389,094

(22) PCT Filed: Aug. 4, 2010

(86) PCT No.: PCT/JP2010/063179
§ 371 (c)(1),
(2), (4) Date: Mar. 2, 2012

(87) PCT Pub. No.: WO2011/016484
PCT Pub. Date: Feb. 10, 2011

(65) Prior Publication Data
US 2012/0193417 A1 Aug. 2, 2012

(30) Foreign Application Priority Data
Oct. 23, 2009 (JP) .................................. 2009-244019

(51) Int. Cl.
*G06K 7/08* (2006.01)
(52) U.S. Cl.
USPC ............................. 235/449; 235/475; 235/379
(58) Field of Classification Search
USPC ........................................................ 235/449
See application file for complete search history.

(56) References Cited

U.S. PATENT DOCUMENTS

| | | | | |
|---|---|---|---|---|
| 5,698,832 A | * | 12/1997 | Someya et al. | 235/449 |
| 6,042,010 A | * | 3/2000 | Kanayama et al. | 235/449 |
| 6,342,982 B1 | * | 1/2002 | Kanayama et al. | 360/2 |
| 2009/0195993 A1 | * | 8/2009 | Herd | 361/724 |
| 2012/0193417 A1 | * | 8/2012 | Watanabe et al. | 235/449 |

FOREIGN PATENT DOCUMENTS

| | | |
|---|---|---|
| JP | 08/279240 | 10/1996 |
| JP | 9-265768 | 10/1997 |
| JP | 4070826 | 1/2008 |
| JP | 2008-186086 | 8/2008 |

OTHER PUBLICATIONS

International Search Report for Application No. PCT/JP2010/063179 mailed Oct. 26, 2010.

* cited by examiner

*Primary Examiner* — Thien M Le
*Assistant Examiner* — Asifa Habib
(74) *Attorney, Agent, or Firm* — Frommer Lawrence & Haug LLP

(57) ABSTRACT

A card reader with magnetic heads, an anterior frame, a main body frame, a control board and a sealing member formed to be annular. The main body frame has a head arrangement in which the magnetic heads are positioned, a sac-like card cage in which the rear end of the inserted card is housed, and a seal arrangement which is formed between the head arrangement and the card cage and in which the sealing member is arranged. The anterior frame has a substantially cylindrical cylinder portion formed to connect to a front face portion. A rear end side portion of the cylinder portion (crushing portion) crushes the sealing member in the radial direction from the outer circumferential side of the sealing member. The control board is arranged outside the card cage, and the inner circumferential face of the seal crushing portion is formed in a tapered shape.

14 Claims, 9 Drawing Sheets

CARD READER

The present application claims priority from PCT Patent Application No. PCT/JP2010/063179 filed on Aug. 4, 2010, which claims priority from Japanese Patent Application No. JP 2009-244019 filed on Oct. 23, 2009, which claims priority from U.S. Provisional Patent Application Ser. No. 61/232,174 filed on Aug. 7, 2009, the disclosures of which is incorporated herein by reference in its entirety.

FIELD OF THE INVENTION

The present invention relates to a card reader that is mounted in a predetermined host device for use.

DESCRIPTION OF RELATED ART

Conventionally a so-called dip-type card reader is widely used for reading magnetic information recorded on a card when a card inserted into the card reader is pulled out. A well-known card reader of this type is a dip-type card reader that is mounted for use in vending machines at gas stations (see Japanese Patent Application No. JP 4070826 ("JP 4070826"), for example).

A card reader disclosed in JP 4070826 is provided with a card encasement in which a card inserted from a card insertion slot is housed; the card encasement has a front portion arranged on the card insertion slot side, a rear portion arranged on the deep inside in the card insertion direction, and a flange-shaped wall portion arranged between the front portion and the rear portion. On the front portion, a head attachment section to which a magnetic head is to be attached is formed. Outside the rear portion a control board is fixed.

This card reader is also provided with a protective cover in which a card inlet portion is formed and which protects the head attachment section, etc. Between the flange portion formed at the protective cover and the wall portion of the card encasement, a sealing member is arranged. The sealing member is sandwiched between the flange portion of the protective cover and the wall portion of the card encasement in the card insertion direction and crushed in the thickness direction of the sealing member. In the card reader disclosed in JP 4070826, the wall portion and the sealing member together prevent liquid such as water or gasoline that has entered from the card insertion slot from invading outside the rear portion of the card encasement (in other words, the location where the control board is arranged).

As described above, in the card reader disclosed in JP 4070826, the sealing member sandwiched between the flange portion of the protective cover and the wall portion of the card encasement in the card insertion direction is crushed in the thickness direction of the sealing member. Therefore, if, in this card reader, the flatness of the flange portion of the protective cover or the flatness of the wall portion of the card encasement is poor, the sealing effectiveness of the sealing member may be reduced. As a result, it may be difficult in this card reader to reliably prevent ingress of liquid to the location where a control board is arranged.

SUMMARY OF THE INVENTION

An objective of the present invention is to provide a card reader capable of reliably preventing ingress of liquid to the location where the control board is arranged.

To achieve the above objective, a card reader of the present invention having magnetic heads which abut on a card to read magnetic information recorded on the card and/or to write magnetic information on the card and mounted in a host device for use, is provided with an anterior frame in which a card insertion slot is formed, a main body frame fixed to the anterior frame, a control board to which the magnetic heads are electrically connected, and a sealing member formed to be annular and arranged between the anterior frame and the main body frame; wherein, taking the card insertion direction as the first direction, the main body frame is provided with a head arrangement in which the magnetic heads are arranged, a sac-shaped card cage in which the first direction side of a card inserted from the insertion slot is housed, a seal arrangement which is formed between the head arrangement and the card cage and in which the sealing member is arranged such that the inner circumference of the sealing member makes contact therewith; the anterior frame is provided with a front face portion configuring the anterior of the card reader and a substantially cylindrical cylinder portion which is formed so as to connect to the front face portion and also formed from the front face portion toward the first direction side; wherein the head arrangement is positioned on the inner circumferential side of the cylinder portion, the insertion slot is formed to the front face portion such that the card inserted from the insertion slot passes the inner circumferential side of the cylinder portion, the first direction end portion of the cylinder portion is formed as a seal crushing portion that crushes the sealing member in the radial direction from the outer circumferential side of the sealing member, the control board is arranged more toward the first direction side than the seal arrangement and also outside the card cage portion, and the inner circumferential surface of the seal crushing portion is formed into a tapered shape which fans out in the radial direction of the seal crushing portion as toward the first direction side.

In the card reader of the present invention, taking the card insertion direction as the first direction, formed to the main body frame are a sac-shaped card cage, in which the first direction side of the card inserted from the card insertion slot is housed, and a head arrangement, in which the magnetic heads are arranged. Also, the seal arrangement, in which the sealing member is arranged such that the inner circumference of the annularly-formed sealing member makes contact therewith, is formed between the card cage and the head arrangement. Further, the substantially cylindrical cylinder portion is formed to the anterior frame so as to connect to the front face portion configuring the anterior of the card reader and formed from the front face portion toward the first direction side, and the head arrangement is positioned on the inner circumferential side of the cylinder portion. Also, the end portion of the cylinder portion in the first direction is formed as a seal crushing portion which crushes the sealing member in the radial direction from the outer circumferential side of the sealing member. The inner circumferential surface of the seal crushing portion is formed in a tapered shape fanning out in the radial direction of the seal crushing portion as toward the first direction.

As described, in the present invention, the annularly-formed sealing member arranged between the seal arrangement in the main body frame and the seal crushing portion in the anterior frame is crushed in the radial direction from the outer circumferential side of the sealing member by the inner circumferential surface of the seal crushing portion which is formed in a tapered shape. Therefore, it is possible in the present invention that the entire circumference of the sealing member is reliably crushed from the outer circumferential side by the inner circumferential surface of the seal crushing portion. This makes it possible to prevent liquid that has entered from the card insertion slot from further invading the control board arrangement location which is more toward the first direction side than the seal arrangement and which is located outside the sac-shaped card cage portion. In other words, ingress of liquid to the location where the control board is arranged can reliably be prevented.

In the present invention, it is preferred that the inner circumferential contact surface of the seal arrangement with which the inner circumference of the sealing member makes contact be formed into a convex surface which swells outwardly in the radial direction of the seal arrangement. By configuring it this way, the entire circumference of the sealing member can be more reliably crushed by the inner circumferential surface of the seal crushing portion which is formed in a tapered shape.

In the present invention, it is preferred that the first direction end side of the seal arrangement have an end portion contact surface with which the first direction end side of the sealing member makes contact. In this case, it is preferred that a seal arrangement groove in which the sealing member is arranged be formed to the seal arrangement. In this way, even when the sealing member is crushed from the outer circumferential side by the inner circumferential surface of the seal crushing portion which is formed in a tapered shape, the sealing member will hardly be shifted from the seal arrangement in the first direction when the main body frame is fastened to the anterior frame. Therefore, it is possible to reliably crush the entire circumference of the sealing member from the outer circumferential side by the inner circumferential surface of the seal crushing portion. Also, the work of fastening the main body frame to the anterior frame is facilitated.

In the present invention, it is preferred that the main body frame be configured by a first frame and a second frame which are the divisions in the card thickness direction, the first frame be provided with a first cage frame portion which configures part of the card cage, the second frame be provided with a second cage frame portion which configures the card cage together with the first cage frame portion, and a sealing material be applied to a joint portion joining the first cage frame portion and the second cage frame portion to seal the joint portion. With this configuration, even when the main body frame is formed into a sac-shape, the main body frame can be formed by using a relatively simple mold.

In the present invention, it is preferred that an outer circumferential end wall that stands in the card thickness direction be formed at the outer circumferential end of the first cage frame portion, the first cage frame portion and the second cage frame portion be joined together under the condition where the outer circumferential end of the second cage frame portion is positioned on the inner circumferential surface side of the outer circumferential end wall, and a sealing material filling groove to hold the sealing material be formed along the outer circumferential end wall in the outer circumferential portion of the first and second cage frame portions which is the joint portion. With this configuration, even when the main body frame is configured by the first and second frames which are the divisions in the card thickness direction, liquid can reliably be prevented from invading from the joint portion between the first cage frame portion and the second cage frame portion to the outside of the card cage where the control board is arranged.

In the present invention, it is preferred that passing holes be formed more toward the inner circumferential side than the sealing member so that cables pulled out from the magnetic heads and connected to the control board pass through them, and the sealing material be filled in the passing holes to seal the passing holes. With this configuration, even when the cables which are pulled out from the magnetic heads arranged more toward the card insertion slot than the seal arrangement are connected to the control board arranged more toward the first direction side than the seal arrangement, it reliably prevents ingress of liquid from the passing holes to the location where the control board is arranged.

In the present invention, it is preferred that a partition wall be formed between the card cage and the seal arrangement, through holes be formed in the partition wall so that screws pass through to fasten the main body frame to the anterior frame, and the through holes be arranged outside the sealing member in the radial direction. This configuration eliminates the possibility that liquid entering from the card insertion slot passes the through holes and further invades the control board arrangement portion. Therefore, there is no need to provide a means at the through holes to prevent ingress of liquid. Accordingly, the configuration of the card reader can be simplified.

In the present invention, it is preferred that the front face portion be arranged at the opening portion which is formed in an anterior panel of a host device and configures part of the anterior panel, a display panel be formed in the front face portion to display the operation status of the card reader, a light source be mounted on the control board, and a light-guiding portion be formed outside the cylindrical portion in the radial direction to guide light emitted from the light source to the display panel. This configuration prevents ingress of liquid from the light-guiding portion to the location where the control board is arranged while the operation status of the card reader can be displayed on the display panel by using the light source mounted on the control board.

In the present invention, it is preferred that the card reader be provided with a card detection mechanism to detect that a card is housed in the card cage, the card detection mechanism be provided with an optical sensor having a light-emitting device and a light-receiving device and a light-shielding member to intercept the light traveling from the light-emitting device to the light-receiving device, the sensor be arranged outside the card cage and the light-shielding member be arranged inside the card cage. With this configuration, ingress of liquid to the sensor can reliably be prevented.

In this case, the card cage is formed of a light transmitting member which transmits light emitted from the light-emitting device. Also, in this case, it is preferred that the light-shielding member be configured by a flat spring. With this configuration, the movement of the light-shielding member is hardly affected even if the light-shielding member becomes rusted because of liquid which invades inside the card cage.

In the present invention, it is preferred that the card cage be transparent or semi-transparent. If foreign matter becomes stuck in the sac-shaped card cage, this configuration allows [the operator] to confirm the presence of the stuck foreign matter visually.

As described, in the present invention, ingress of liquid to a location where the control board is arranged can reliably be prevented.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
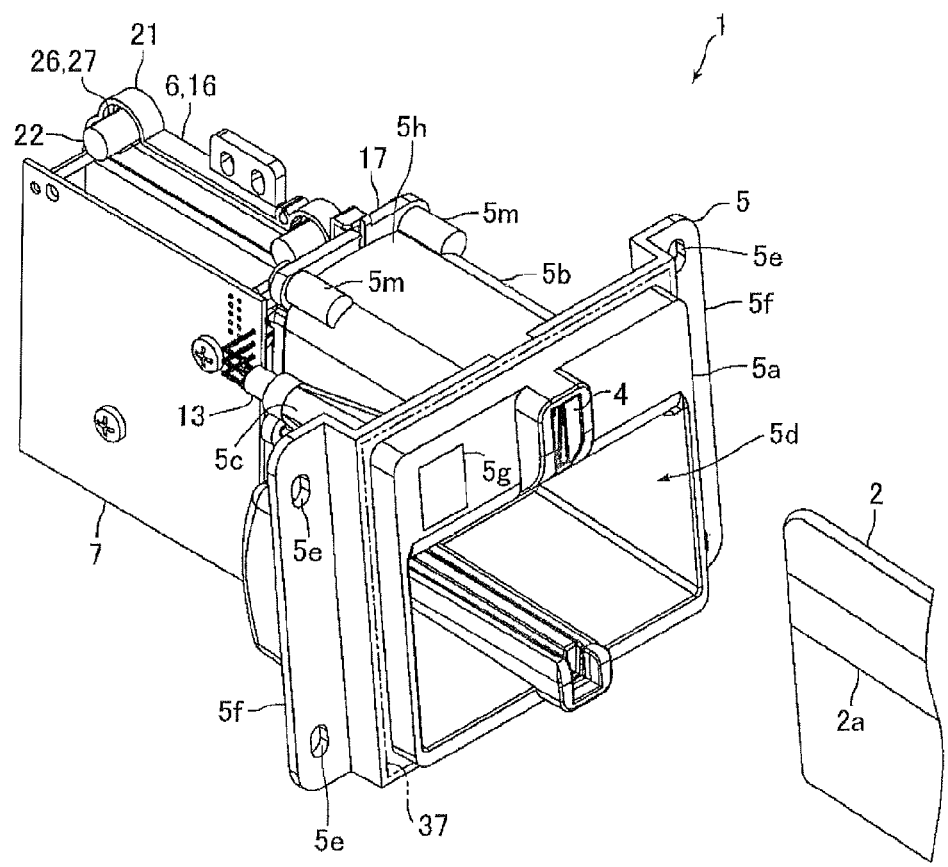
FIG. 1 shows a perspective view of a card reader of an embodiment of the present invention.
Figure 1:
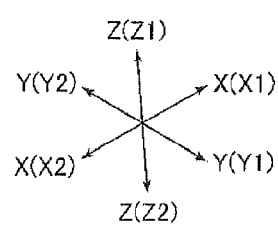
Figure 2:
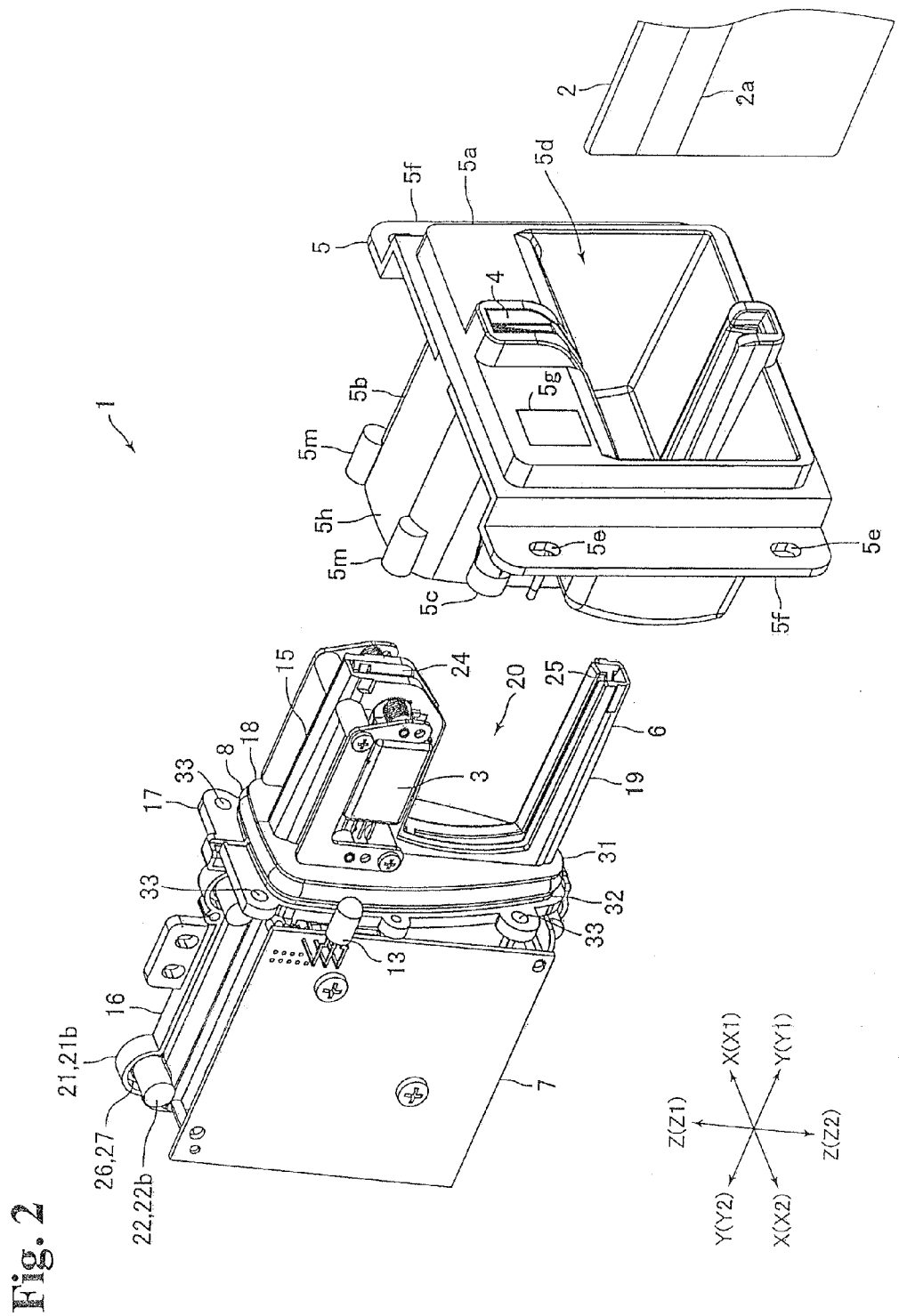
FIG. 2 shows a perspective view of a disassembly of the card reader of FIG. 1.
Figure 3:
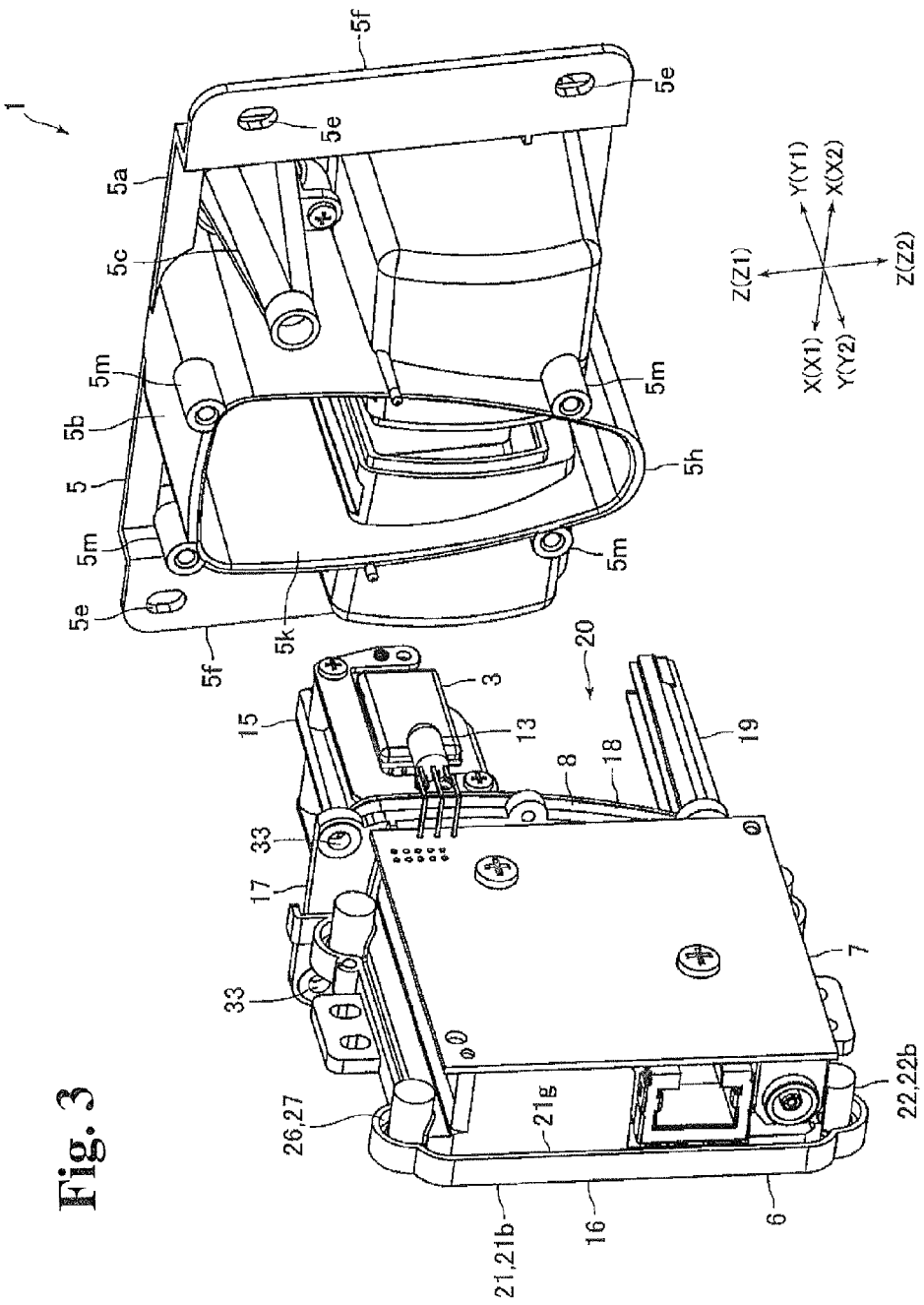
FIG. 3 shows a perspective view of the disassembly of the card reader of FIG. 1, when viewed from the other direction.
Figure 4:
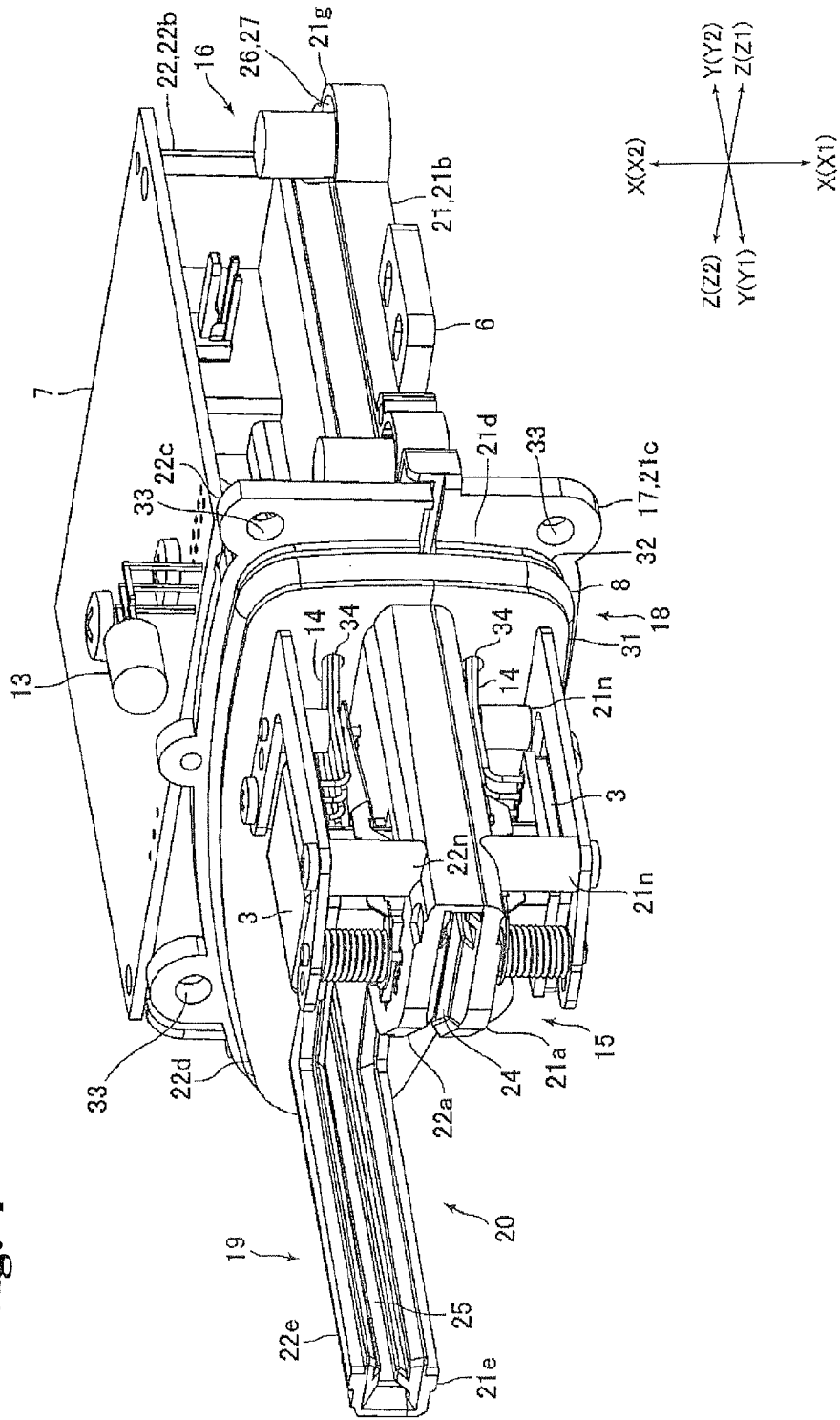
FIG. 4 shows a A perspective view of the card reader of FIG. 1 with the anterior frame removed.
Figure 5:
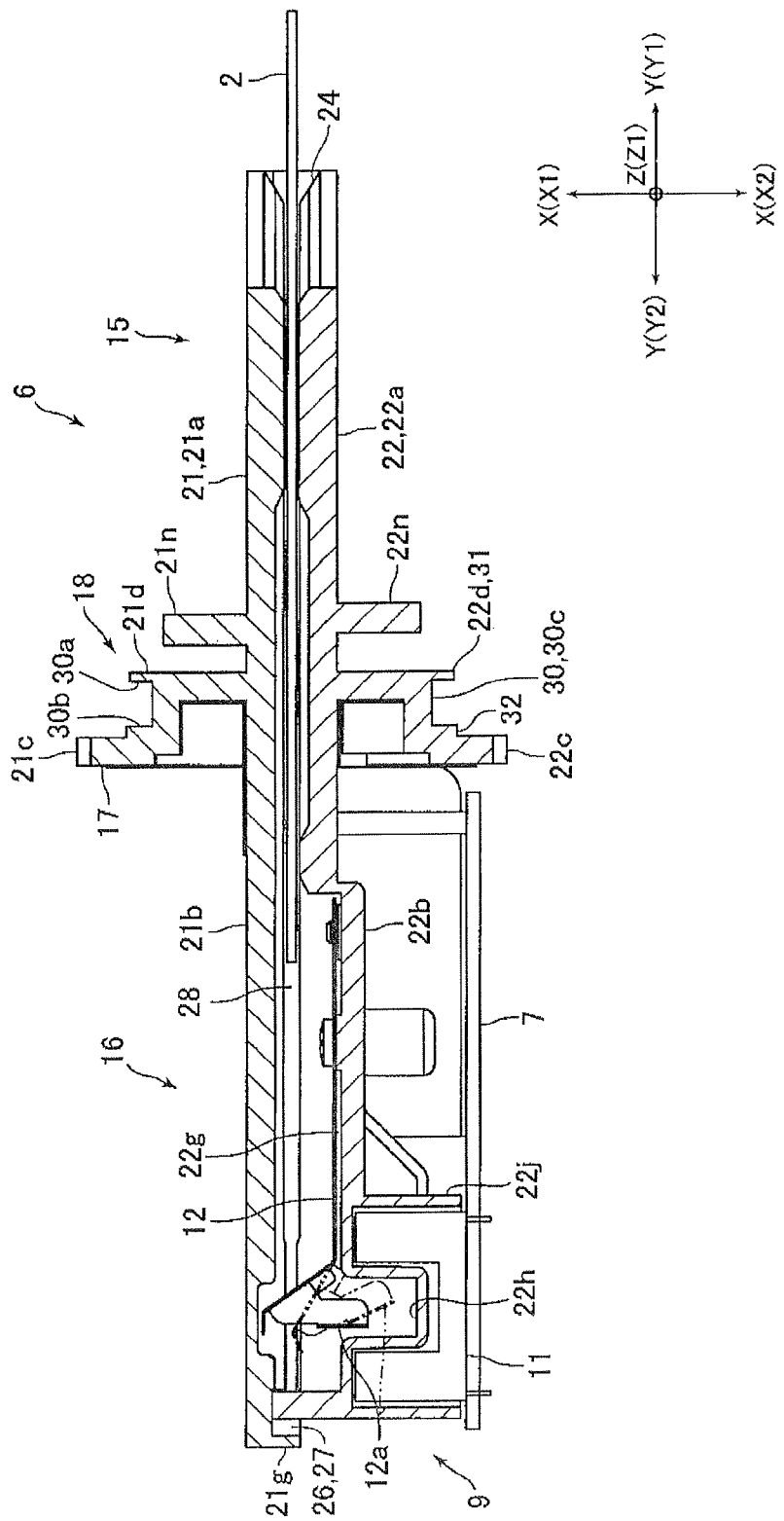
FIG. 5 shows a cross-sectional view to explain the configuration of the inside of the main body frame shown in FIG. 1.

Configuration of Card Reader:

FIG. 1 is a perspective view of a card reader 1 of an embodiment of the present invention. FIG. 2 is a perspective view of a disassembly of the card reader 1 shown in FIG. 1. FIG. 3 is a perspective view of the disassembly of the card reader 1 shown in FIG. 1, when viewed from the other direction. FIG. 4 is a perspective view of the card reader 1 shown in FIG. 1 with the anterior frame 5 removed from the card reader 1. FIG. 5 is a cross-sectional view to explain the configuration of the inside of the main body frame 6 shown in FIGS. 6(A) and 6(B).

The card reader 1 of this embodiment is a device which reads magnetic information recorded on a card 2 as a user operates the card 2 by hand. More specifically, the card reader 1 is a so-called dip-type card reader which reads magnetic information on a card 2 when the card 2 is inserted to the card reader 1 or when the card 2 which has been inserted to the card reader 1 is pulled out. Such a card reader 1 is mounted and used in a host device such as a gas supplying device at a self- or full-service gas station.

The card reader 1, as shown in FIG. 1 through FIG. 5, is provided with two magnetic heads 3 which abut on a card 2 and read magnetic information recorded on heads 3 which abut read the card 2, an anterior frame 5 in which an insertion slot 4 for the card 2 is formed, a main body frame 6 which is fixed to the anterior frame 5, a control board 7 for controlling the card reader 1, a sealing member 8 arranged between the annularly-formed anterior frame 5 and the main body frame 6, and a card detection mechanism 9 for detecting that the card 2 is inserted to the card reader 1.

Note that in the description below, as shown in FIG. 1, etc., that three directions that are orthogonally intersecting with each other are respectively an X direction, a Y direction and a Z direction. In FIG. 1, the X1 direction is a "right" side, the X2 direction is a "left" side, the Y1 direction is a "front" side, the Y2 direction is a "rear" side, the Z1 direction is an "upper" side, and the Z2 direction is a "lower" side. In this embodiment, the card 2 is inserted in the Y2 direction into the card reader 1. In other words, in this embodiment, the Y2 direction (the rear direction) is the insertion direction of card 2 and is defined as the first direction. Also, in this embodiment, the X direction (left-right) direction is the thickness direction of the card 2 inserted into the card reader 1.

The card 2 is a rectangular vinyl chloride card having a thickness of 0.7 to 0.8 mm, for example. On the card 2, a magnetic stripe 2a is formed so that magnetic data can be recorded thereon. Note that, the card 2 may be a PET (polyethylene terephthalate) card having a thickness of 0.18 to 0 36 mm or a paper card having a predetermined thickness.

The card detection mechanism 9 is provided with an optical sensor 11 having a light-emitting device and a light-receiving device which are not illustrated and a light-shielding member 12 which blocks the light emitted from the light-emitting device toward the light-receiving device (see FIG. 5). The sensor 11 of this embodiment is a light-transmitting optical sensor in which the light-emitting device and the light-receiving device are arranged opposite to each other. Also, the light-shielding member 12 of this embodiment is configured by a flat spring. To the rear end portion of the light-shielding member 12, as shown in FIG. 5, a light-shielding plate 12a is formed to block the light emitted from the light-emitting device toward the light-receiving device.

The sensor 11 is mounted on the rear end side of the control board 7. A light source 13 is mounted on the front end side of the control board 7. The light source 13 is a LED (Light Emitting Diode). The magnetic heads 3 are electrically connected to the control board 7 via lead wires 14 (see FIG. 4) which are cables.

Figure 6:
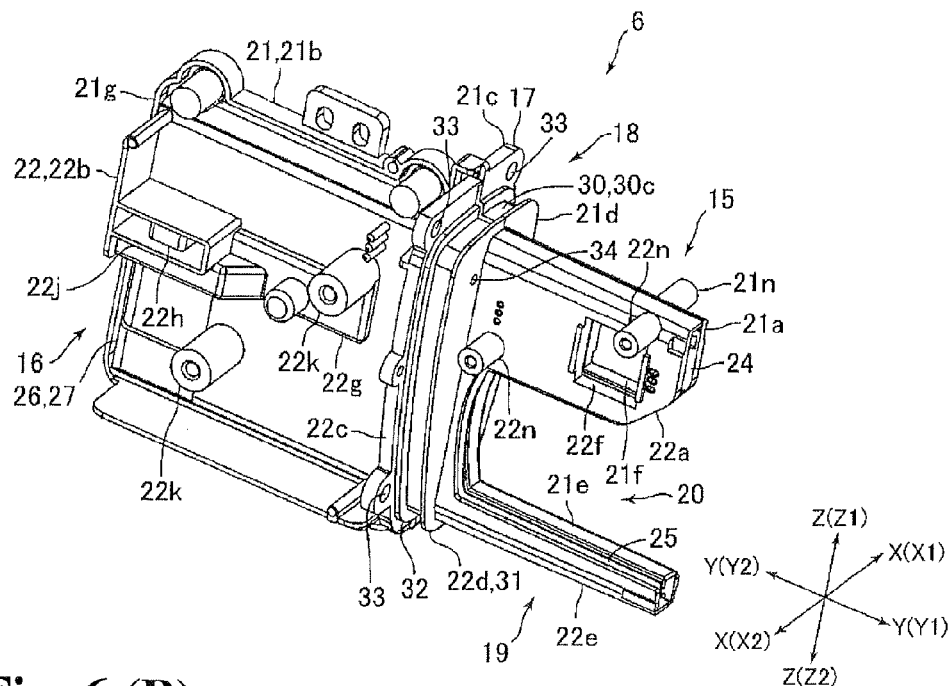
FIGS. 6(A) and 6(B) show perspective views to explain the configuration of the main body frame shown in FIG. 1.
Figure 6:
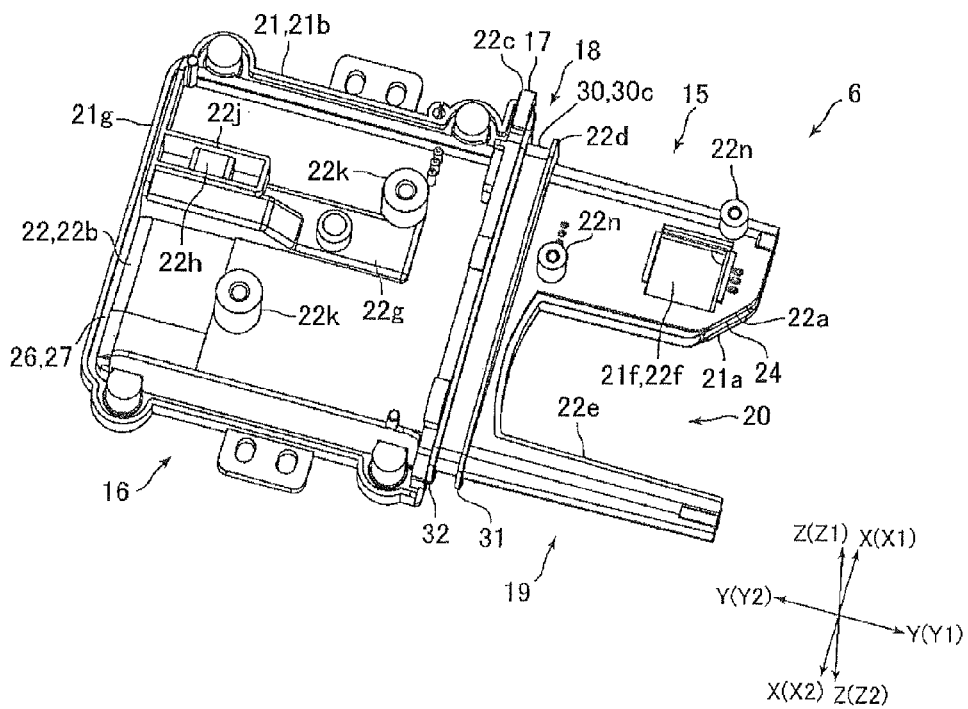
Figure 7:
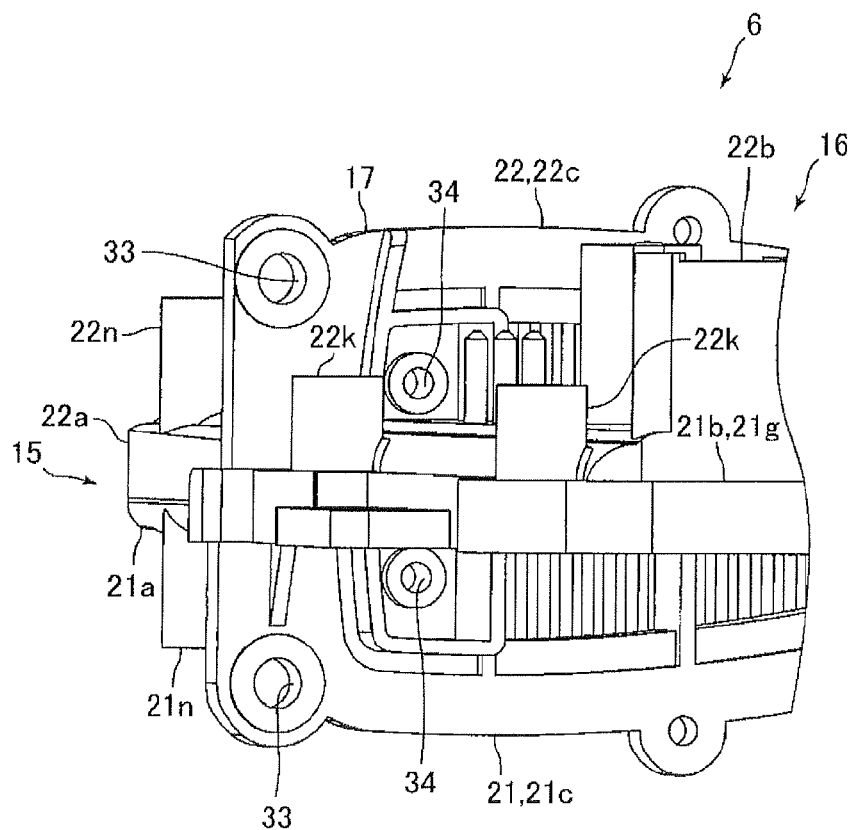
FIG. 7 shows a perspective view to explain passing holes formed in the partition wall portion shown in FIGS. 6(A) and 6(B)
Figure 7:
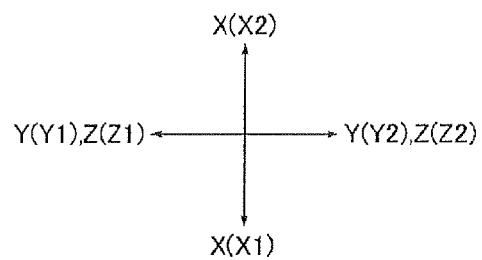
Figure 8:
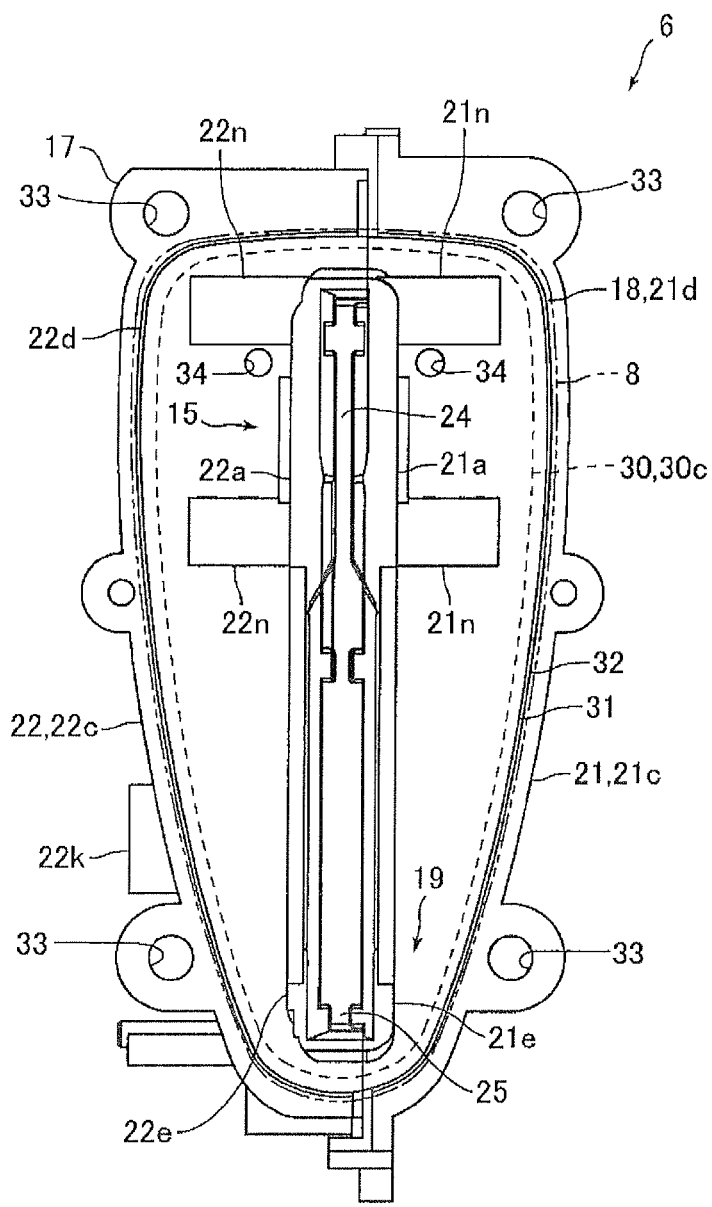
FIG. 8 shows a front view of the main body frame shown in FIG. 1.
Figure 8:
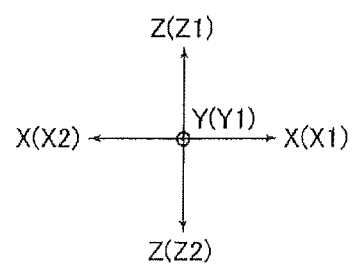

Configuration of Main Body Frame:

FIGS. 6(A) and 6(B) are perspective views to explain the configuration of the main body frame 6 shown in FIG. 1. FIG. 7 is a perspective view to explain passing holes 34 formed in a partition wall 17 shown in FIGS. 6(A) and 6(B). FIG. 8 is a front view of the main body frame 6 shown in FIG. 1.

The main body frame 6 is provided with a head arrangement 15 in which the magnetic heads 3 are arranged, a sac-shaped card cage 16 in which the rear end side of the card 2 inserted from the insertion slot 4 is housed, a partition wall 17 formed between the head arrangement 15 and the card cage 16, a seal arrangement 18 formed between the head arrangement 15 and the partition wall 17, in which the sealing member 8 is arranged, and a card guiding portion 19 which guides the card 2 inserted from the insertion slot 4.

As shown in FIGS. 6(A) and 6(B), the head arrangement 15 and the card guiding portion 19 are formed so as to project toward the front from the seal arrangement 18. Also, the head arrangement 15 is arranged on the upper end side of the main body frame 6 and the card guiding portion 19 is arranged on the lower end side of the main body frame 6. Between the head arrangement 15 and the card guiding portion 19 in the upper-lower direction, a notch portion 20 is created.

Also, the main body frame 6 of this embodiment is configured by a first frame 21 and a second frame 22 which are divisions in the left-right direction. In this embodiment, the right side face of the main body frame 6 is configured by the first frame 21 and the left side face of the main body frame 6 is configured by the second frame 22. The first frame 21 and the second frame 22 are fastened together by screws (not illustrated) arranged at four corners of the card cage 16.

The first frame 21 and the second frame 22 are formed of a light transmitting member that transmits the light emitted by the light-emitting device of the sensor 11. More specifically, the first frame 21 and the second frame 22 are formed of a transparent resin material. Alternately the first frame 21 and the second frame 22 may be formed of a semi-transparent resin material. Also, the first frame 21 and the second frame 22 are formed by a mold.

The first frame 21 is provided with a first head arrangement 21a which configures part of the head arrangement 15, a first cage frame portion 21b which configures part of the card cage 16, a first partition wall 21c which configures part of the partition wail 17, a first seal arrangement frame portion 21d which configures part of the seal arrangement, and a first card guiding frame portion 21e which configures part of the card guiding portion 19.

The second frame 22 is provided with a second head arrangement portion 22a which configures the head arrangement 15 together with the first head arrangement portion 21a, a second cage frame portion 22b which configures the card cage 16 together with the first cage frame portion 21b, a second partition wall 22c which configures the partition wall 17 together with the first partition wall 21c, a second seal arrangement frame portion 22d which configures the seal arrangement 18 together with the first seal arrangement frame portion 21d, and a second card guide frame portion 22e which configures the card guide portion 19 together with the first card guide frame portion 21e.

Arrangement holes 21f, 22f are formed respectively in the first head arrangement portion 21a and the second head arrangement portion 22a for the magnetic heads to be arranged therein. Between the first head arrangement portion 21a and the second head arrangement portion 22a, a card guiding groove 24 is formed to guide the right side edge of the card 2 which is inserted from the insertion slot 4. The two magnetic heads 3 are respectively arranged in the first head arrangement portion 21a and the second head arrangement portion 22a such that they are opposite to each other via a gap in the card guiding groove 24. Therefore, in this card reader 1, magnetic data on the card 2 can be read no matter which direction the card faces when inserted. Note that magnetic head mounting protrusions 21n, 22n are formed to the first head arrangement 21a and the second head arrangement 22a respectively for mounting the magnetic heads 3 in the head arrangement 15.

Between the first card guiding frame portion 21e and the second card guiding frame portion 22e, the card guiding groove 25 is formed to guide the left side edge of the card 2 which is inserted from the insertion slot 4.

The first cage frame portion 21b and the second cage frame portion 22b are formed such that the shape thereof when viewed in the left-right direction is rectangular.

At the upper and lower ends and the rear end of the first cage frame portion 21b, an outer circumferential end wall portion 21g is formed standing toward the left side. In other words, the outer circumferential edge wall portion 21g is formed at the outer circumferential edge of the first cage frame portion 21b, standing in the thickness direction of the card 2. Note that the front edge of the first cage frame portion 21b makes contact with the first partition wall portion 21c. Also, the front edge of the second cage frame portion 22b makes contact with the second partition wall portion 22c.

The first cage frame portion 21b and the second cage frame portion 22b are joined together along the upper and lower edges and the rear edge. In other words, the outer circumferential side portion of the card cage 16 is a joint portion 26 that joins the first cage frame portion 21b and the second cage frame portion 22b. In this embodiment, the first cage frame portion 22b and the second cage frame portion 22b are joined together under the condition where the upper and lower edges and the rear edge of the second cage frame portion 22b (that is, the outer circumferential edge of the second cage frame portion 22b) is positioned on the inner circumferential side of the outer circumferential edge wall portion 21g. More specifically, the first cage frame portion 21b and the second cage frame portion 22b are joined together under the condition where the outer circumferential edge of the second cage frame portion 22b and the inner circumferential surface of the outer circumferential edge wall portion 21b lightly make contact with each other.

As shown in FIGS. 6(A) and 6(B), the second cage frame portion 22b is configured such that the portions thereof, except for the outer circumferential edge portion, project to the left side; and at the upper-lower end portions and the rear end portion of the card cage 16 which is the joint portion 26, a groove 27 is formed along the outer circumferential edge wall portion 21g. In the groove 27, a sealing material such as silicon (no illustration) is filled to seal the joint portion 26. In other words, in this embodiment, a sealing material is applied to the joint portion 26 between the first cage frame portion 21b and the second cage frame portion 21b. Therefore, in this embodiment, a sealed housing space 28 (see FIG. 5) for a card 2 is created between the first cage frame portion 21b and the second cage frame portion 22b (that is, the inside of the card cage 16). The groove 27 of this embodiment is a sealing material filling groove for the sealing material to be filled.

In the second cage frame portion 22b, an arrangement recess portion 22g is formed to arrange the light-shielding member 12. The arrangement recess portion 22g is formed so as to depress from the right side face of the second cage frame portion 22b toward the left side. Also, as shown in FIG. 5, a portion of the arrangement recess portion 22g at the rear end is used as a light-shielding plate arrangement recess portion 22h in which the light-shielding plate 12a is arranged. The light-shielding plate arrangement recess portion 22h is formed to depress further to the left side than other portions of the arrangement recess portion 22g.

As shown in FIG. 5, the sensor 11 is arranged on the left side face of the second cage frame portion 22b. More specifically, the sensor 11 is arranged on the left side face of the second cage frame portion 22b so that the light-shielding plate arrangement recess portion 22h is positioned between the light-emitting device and the light-receiving device of the sensor 11. In other words, in this embodiment the sensor 11 is positioned outside the card cage 16. On the other hand, the light-shielding plate 12 is arranged on the right side face of the second cage frame portion 22b. More specifically described, the front end portion of the light-shielding plate 12a is fixed to the right side face of the second cage frame portion 22b so that the light-shielding member 12 is positioned in the light-shielding plate arrangement recess portion 22h. In other words, the light-shielding member 12 is arranged inside the card cage 16.

In this embodiment, when the rear end of the card 2 is not housed in the card cage 16, the right edge of the light-shielding plate 12a is positioned on the right side of the location where the card 2 would pass by, as shown by the solid line in FIG. 5; the light-shielding plate 12a does not intercept between the light-emitting device and the light-receiving device of the sensor 11. On the other hand, when the rear end of the card 2 is housed in the card cage 16, the rear end of the card 2 abuts on the right edge of the light-shielding plate 12a and the light-shielding member 12 deforms having the front end thereof as a fulcrum. When the light-shielding member 12 deforms having the front end thereof as a fulcrum, as shown by the double dotted line in FIG. 5, the light-shielding plate 12a intercepts between the light-emitting device and the light-receiving device of the sensor 11. In this embodiment, when the light-shielding plate 12a intercepts between the light-emitting device and the light-receiving device of the sensor 11, it is determined that the rear end of the card 2 is housed in the card cage 16.

Note that in the left side face of the second cage frame portion 22b, a wall portion 22j surrounding the sensor 11 and a board fixing protrusion 22k for fixing the control hoard 7 are formed, The control hoard 7 is fixed to the left edge of the board fixing protrusion 22k and arranged outside the card cage 16. Also, the control board 7 is positioned more toward the rear end than the partition wall 17.

The first seal arrangement frame portion 21d is formed in a flange shape that is widened to the upper and lower sides and to the right side; the second seal arrangement frame portion 22d is formed in a flange shape that is widened to the upper and lower sides and to the left side. In other words, the seal arrangement 18 is formed in a flange shape that is widened to the upper and lower sides and to the left-right sides. Also, the seal arrangement 18 is formed, as shown in FIG. 8, such that the shape thereof when viewed from the front-back direction is in a semi-oval shape that the upper side thereof is wider in the left-right direction and the lower side thereof is narrower in the left-right direction.

Along the outer circumferential surface of the seal arrangement 18, the seal arrangement groove 30 is created for the sealing member 18 to be arranged. More specifically described, the seal arrangement groove 30 is formed being depressed in the radial direction toward the inside of the seal arrangement 18. In other words, the seal arrangement 18 is provided with a front wall portion 31 which configures the wall face in front (the front wall 30a, see FIG. 5) of the seal arrangement groove 30 and a back wall portion 32 which configures the wall face in back (the back wall face 30b, see FIG. 5) of the seal arrangement groove 30. The back wall face 30b of this embodiment is an end portion contact surface with which the rear end of the sealing member 8 makes contact.

A bottom face 30c of the seal arrangement groove 30 is formed, as shown in FIG. 8, such that the shape thereof when viewed from the front-rear direction is a semi-oval shape in which the upper side thereof is wider in the left-right direction and the lower side thereof is narrower in the left-right direction. Also, the bottom face 30c of the seal arrangement groove 30 is formed in a convex surface shape, as shown in FIG. 8, that swells in the radial direction toward the outside the seal arrangement 18. In this embodiment, the sealing member 8 is arranged in the seal arrangement 18 such that the inner circumference of the sealing member 8 makes contact with the bottom face 30c of the seal arrangement groove 30. The bottom face 30c of the seal arrangement groove 30 of this embodiment is an inner circumferential contact surface with which the inner circumference of the sealing member 8 makes contact.

In this embodiment, the front wall portion 31 and the back wall portion 32 are formed such that the outer circumferential end of the sealing member 8 projects more outwardly in the radial direction of the seal arrangement 18 than the outer circumferential end of the front wall portion 31 and the outer circumferential end of the back wall portion 32. Note that, in this embodiment, the outer circumferential end of the back wall portion 32 projects more outwardly in the radial direction of the seal arrangement 18 than the outer circumferential end of the front wall portion 31.

The first partition wall portion 21c is formed in a flange shape that projects to the upper and lower sides and the right side more than the first seal arrangement frame portion 21d does, and the second partition wall portion 22c is formed in a flange shape that projects to the upper and lower sides and the left side more than the second seal arrangement frame portion 22d does.

Formed at four locations at the upper end and the lower end of the partition wall 17 are through holes 33 through which screws (no illustration) pass to fasten the main body frame 6 to the anterior frame 5. More specifically described, as shown in FIG. 8, the through holes 33 are formed to be positioned radially outside the sealing member 8 arranged in the seal arrangement 18.

In the partition wall 17 and the seal arrangement 18, two passing holes 34 are formed so that lead wires 14 pulled out from the magnetic heads 3 can pass. More specifically described, the passing holes 34 are formed more toward the inner circumferential side of the partition wall 17 and the seal arrangement 18 than the sealing member 8. Also, the passing holes 34 are formed so as to pass through the partition wall 17 and the seal arrangement 18 in the front-back direction (see FIG. 7). Also, as shown in FIG. 7, one of the two passing holes 34 is formed to be positioned more on the right side than the first cage frame portion 21b, and the other one of the passing holes 34 is formed to be positioned more on the left side than the second cage frame portion 22b. In the passing holes 34, a sealing material (no illustration) such as silicon is filled to seal the passing holes 34 under the condition where the lead wires 14 pass through.

Note that in the center of the partition wall 17 and the seal arrangement 18 a card passage is formed so that the card 2 passes toward the card cage 16.

Figure 9:
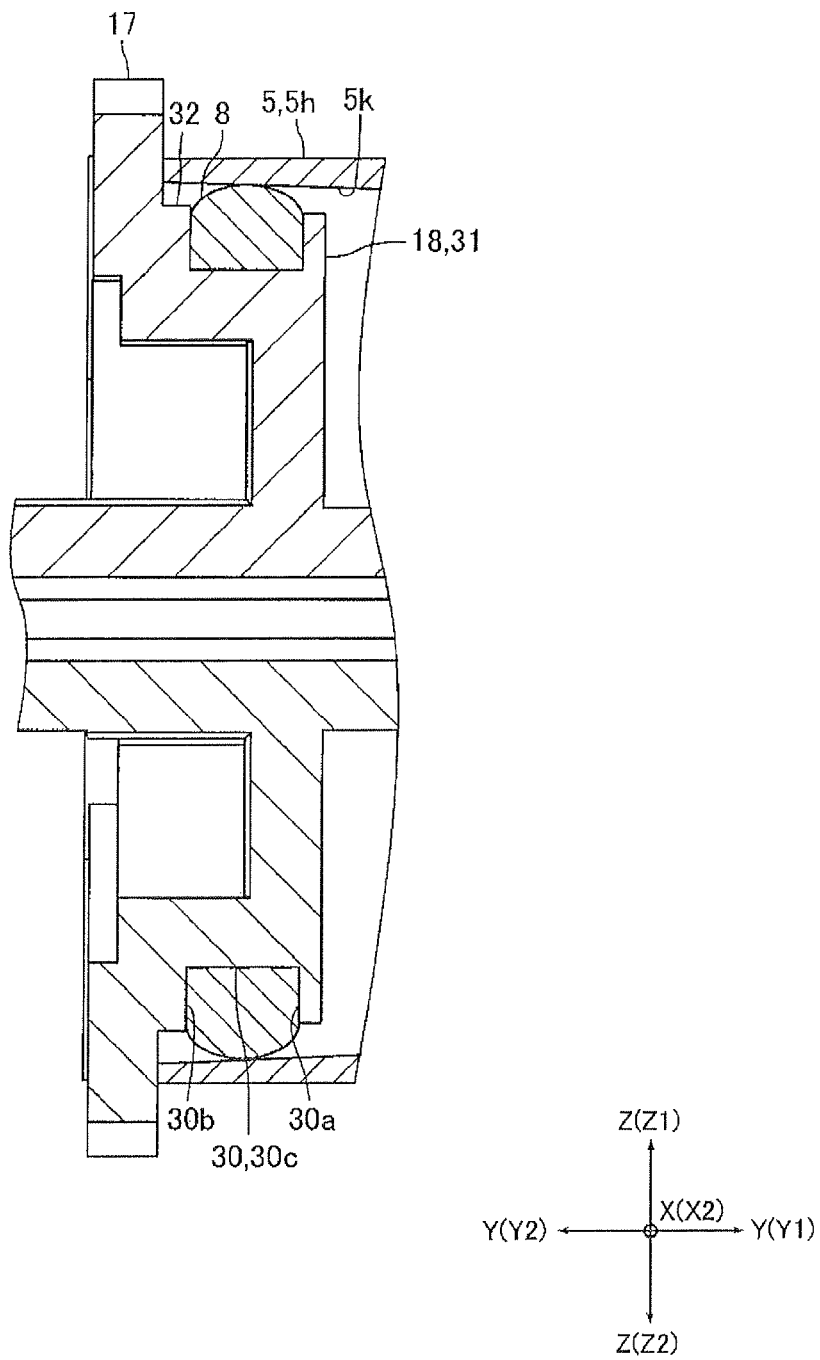
FIG. 9 shows a cross-sectional view to explain the configuration of a sealing member and its periphery shown in FIG. 2.

Configuration of Anterior Frame and Sealing Member:

FIG. 9 is a cross-sectional view to explain the configuration of the sealing member 8 and its periphery shown in FIG. 2.

The anterior frame 5 is formed of a resin material. As shown in FIG. 2 and FIG. 3, the anterior frame 5 is provided with the front face portion 5a that configures the anterior of the card reader 1, a cylindrical cylinder portion 5b formed to connect to the front face portion 5a and formed from the front face portion 5a toward the back, a light-guiding portion 5c that guides light emitted from the light source 13 to the front face portion 5a, and a finger inserting portion 5d formed to be depressed from the front face portion 5a toward the back. The anterior frame 5 of this embodiment has no other opening other than those in the front face of the front face portion 5a and the rear end of the cylinder portion 5b.

The front face portion 5a is arranged in an opening 37 (see FIG. 1) formed in an anterior panel (no illustration) of a host device in which the card reader 1 is mounted, configuring part of the anterior panel of the host device. The front face portion 5a is provided with a fixing portion 5f in which through holes 5e are formed so that screws (no illustration) can be inserted to fasten the card reader 1 to the host device. Also, in the front face portion 5a, a display panel 5g is formed to display the operation status of the card reader 1.

Note that the front face portion 5a is fixed to the anterior panel of the host device via a predetermined sealing member. More specifically described, the front face portion 5a is fixed to the anterior panel of the host device via a sealing member so that liquid such as water will not invade the back of the anterior panel from the opening 37 in the anterior panel.

The insertion slot 4 is formed in the front face of the front face portion 5a. More specifically described, the insertion slot 4 is formed in the front face of the front face portion 5a such that the card 2 inserted from the insertion slot 4 passes the inner circumferential side of the cylinder portion 5b.

On the inner circumferential side of the cylinder portion 5b, the head arrangement 15 and the card guiding portion 19 are arranged. Also, the rear end portion of the cylinder portion 5b is formed as a seal crushing portion 5h that crushes the sealing member 8 in the radial direction from the outer circumferential side of the sealing member 8.

The seal crushing portion 5h is formed in a cylinder shape such that the shape thereof when viewed from the front-back direction is a semi-oval shape in which the upper side thereof is wider in the left-right direction and the lower side thereof is narrower in the left-right direction. More specifically described, the seal crushing portion 5h is formed in a substantially cylinder shape such that the shape thereof when viewed from the front-back direction is a similar figure to the shape of the seal arrangement 18 when viewed from the front-back direction. Even more specifically, the seal crushing portion 5h is formed in a cylinder shape such that the shape thereof when viewed from the front-back direction is a substantially semi-oval shape slightly larger than the outside shape of the seal arrangement 18 when viewed in the front-back direction.

As shown in FIG. 9, the inner circumferential surface 5k of the seal crushing portion 5h is tapered widening outwardly in the radial direction of the seal crushing portion 5h as toward the rear side. Also, at the four corners at the upper and lower ends on the outer circumferential surface of the seal crushing portion 5h, screw engaging portions 5m are formed so that screws passing through the through holes 33 in the partition wall 17 are engaged in the threads thereof. The screw engaging portion 5m is formed in a substantially cylindrical shape, and an internal thread is cut on the inner circumferential surface thereof. In this embodiment, the main body frame 6 is fastened to the anterior frame 5 under the condition where the head arrangement 15 and the card guiding portion 19 are arranged in the cylinder portion 5b and the front face of the partition wall 17 and the rear edge of the cylinder portion 5b (that is, the rear end of the seal crushing portion 5h) are in contact with each other.

The light-guiding portion 5c is formed in a substantially cylindrical shape. Also, the light-guiding portion 5c is formed connected to the display panel 5g and also arranged outside the cylinder portion 5b in the radial direction. As shown in FIG. 1, the light source 13 is inserted to the rear end side of the light-guiding portion 5c so that the light emitted from the light source 13 is guided to the display panel 5g. In this embodiment, the display panel 5g is lighted by the light from the light source 13 to display the operation status of the card reader 1.

The finger-inserting portion 5d is formed extended to both in the left and right sides of the cylinder portion 5b. More specifically, the finger-inserting portion 5d is formed such that the cuboid box-like portion whose inside face in the left-right direction and front face are open is connected to the side faces on the left and right sides and the front face 5a of the cylinder portion 5b. The finger-inserting portion 5d is formed in a size in which a user's finger can be inserted; when a user pulls out the card 2 from the card reader 1 and when a user inserts the card 2 to the card reader 1, the user's finger is inserted to the finger-inserting portion 5d.

The sealing member 8 is formed of rubber, etc. Also, the sealing member 8 is formed to be annular as described above. More specifically, it is formed such that the shape thereof when viewed from the front-back direction is a substantially semi-oval shape in which the upper end is wider in the left-right direction and the lower end is narrower in the left-right direction. Even more specifically, the sealing member 8 is formed in a substantially cylinder shape in which the shape thereof when viewed from the front-back direction is a similar figure to the shape of the seal arrangement groove 30 and the seal crushing portion 5h when viewed from the front back direction. Also, the cross-section of the sealing member 8 is a substantially D-shape.

The sealing member 8 is arranged in the seal arrangement groove 30 and crushed in the radial direction from the outside toward the inside by the inner circumferential surface 5k of the seal crushing portion 5h. In other words, the inner circumference of the sealing member 8 abuts on the bottom face 30c of the seal arrangement groove 30 with a predetermined contact pressure, and the outer circumference of the sealing member 8 abuts on the inner circumferential face 5k of the seal crushing portion 5h with a predetermined contact pressure.

Major Effects of this Embodiment:

As described above, in this embodiment, the groove 27 is created in the outer circumferential end portion of the card cage 16 which is the joint portion 26 between the first cage frame portion 21b and the second cage frame portion 22b together configuring the sac-like card cage 16; in the groove 27, a sealing material is filled to seal the joint portion 26. In this embodiment, a sealing material is also filled in the passing holes 34 through which the lead wires 14 pulled out of the magnetic heads 3 pass. Further, in this embodiment, the inner circumference of the sealing member 8 abuts on the bottom face 30c of the seal arrangement groove 30 with a predetermined contact pressure and the outer circumference of the sealing member 8 abuts on the inner circumferential face 5k of the seal crushing portion 5h with a predetermined contact pressure. For this reason, in this embodiment, liquid that has entered from the front face of the anterior frame 5 (more specifically, the insertion slot 4 and the finger-inserting portion 5d) is prevented from further invading the arrangement location of the control board 7 and the sensor 11 which are positioned more toward the back than the seal arrangement 18 and outside the card cage 16.

Also, in this embodiment, the inner circumferential face 5k of the seal crushing portion 5h is formed in a tapered shape that fans out in the radial direction of the seal crushing portion 5b toward the back side; the sealing member 8 positioned between the seal arrangement groove 30 and the seal crushing portion 5h is crushed in the radial direction from the outer circumferential side by the inner circumferential face 5k of the seal crushing portion 5h which is formed to be tapered. Therefore, in this embodiment, the entire circumference of the sealing member 8 can reliably be crushed from the outer circumferential side by the inner circumferential face 5k of the seal crushing portion 5h. Therefore, in the present invention, liquid that has entered from the front face of the anterior frame 5 is prevented from further invading the arrangement location of the control board 7 and the sensor 11 which are positioned more toward the back than the seal arrangement 18 and outside the card cage 16. In other words, ingress of liquid to the location where the control board 7, etc. are arranged can reliably be prevented.

In particular, in this embodiment, since the bottom face 30c of the seal arrangement groove 30 is formed in a convex surface shape that swells outwardly in the radial direction of the seal arrangement 18, it is possible to reliably crush the entire circumference of the sealing member 8 from the outer circumferential side by the inner circumferential face 5k of the seal crushing portion 5h. Therefore, in this embodiment, liquid that has entered from the front face of the anterior frame 5 can reliably be prevented from further invading the arrangement location of the control board 7, etc.

In this embodiment, a rear side wall face 30b with which the rear end of the sealing member 8 makes contact is formed in the rear end of the seal arrangement 18. Therefore, even when the sealing member 8 is crushed from the outer circumference side by the inner circumferential face 5k of the seal crushing portion 5h which is formed in a tapered shape, the sealing member 8 is hardly shifted to the back from the seal arrangement 18 when the anterior frame 5 is fastened to the main body frame 6. In particular, in this embodiment, the front wall 30a is formed to the front end of the seal arrangement 18; therefore in other words, the seal arrangement groove 30 is created in the seal arrangement 18); therefore, when the main body frame 6 is secured to the anterior frame 5, the sealing member 8 is barely shifted from the seal arrangement 18. Thus, it is possible to reliably crush the entire circumference of the sealing member 8 from the outer circumferential side by the inner circumferential face 5k of the seal crushing portion 5h in this embodiment. Also, in this embodiment, the work of fastening the main body frame 6 to the anterior frame 5 is facilitated.

In this embodiment, the sealing member 8 is crushed in the radial direction from the outer circumferential side by the inner circumferential face 5k of the seal crushing portion 5h. For this reason, compared to the card reader disclosed in the above-described JP 4070826, the dimensional precision of the card reader 1 in the card 2 inserting direction (the dimensional precision of the card reader 1 in the front-back direction) is prevented from degrading. In other words, in the card reader disclosed in the JP 4070826, the sealing member sandwiched between the flange portion of the protective cover and the wall portion of the card cage in the card insertion direction is crushed in the thickness direction of the sealing member; therefore, the entire length of the card reader in the card insertion direction may be varied depending on the crushing strength on the sealing member; on the other hand, in this embodiment, the entire length of the card reader in the front-back direction will not be varied by the crushing strength on the sealing member 8. Therefore, unlike the card reader disclosed in the above-described JP 4070826, the dimensional precision of the card reader 1 in the card 2 insertion direction is kept from degrading.

In this embodiment, the main body frame 6 is configured by the first frame 21 and the second frame 22 which are two divisions in the left-right direction; a sealing material is applied in the joint portion 26 between the first cage frame portion 21b and the second cage frame portion 22b. Therefore, even when the main body frame 6 is formed in a sac shape, the main body frame 6 can be formed by using a relatively simple mold. Also, in this embodiment, the groove 27 is created in the outer circumferential end portion of the card cage 16 which is the joint portion 26 between the first cage frame portion 21b and the second cage frame portion 22b, and a sealing material is filled in the groove 27 to seal the joint portion 26. Therefore, even when the main body frame 6 is configured by the first frame 21 and the second frame 22, ingress of liquid to the outside of the card cage 16 can reliably be prevented.

In this embodiment, the through holes 33 through which the screws for fastening the main body frame 6 to the anterior frame 5 pass are formed radially outside the sealing member 8 arranged in the seal arrangement 18. For this reason, liquid that has entered from the front face of the anterior frame 5 will not pass the through holes 33 and further invade the arrangement location of the control board 7, etc. Therefore, in this embodiment, there is no need to provide a means at the through holes 33 to prevent ingress of liquid. Consequently the configuration of the card reader 1 can be simplified in this embodiment.

In this embodiment, the light-guiding portion 5c that guides the light emitted from the light source 13 to the display panel 5c is arranged outside the cylinder portion 5b in the radial direction. Therefore, in this embodiment, while liquid is prevented from invading from the light-guiding portion 5c to the location where the control board 7, etc. are arranged, the operation status of the card reader 1 can be displayed in the display panel by using the light source 13 which is mounted on the control board 7.

In this embodiment, the light-shielding member 12 is configured by a flat spring. Therefore, even if rust is generated on the light-shielding member 12 due to liquid that enters the cage space 28 of the card cage 16, the movement of the light-shielding member 12 will hardly be affected.

In this embodiment, the first frame 21 and the second frame 22 are formed of a transparent resin material or a semi-transparent resin material. Therefore, if foreign matter becomes stuck in the cage space 28 of the sac-like card cage 16, the presence of the stuck foreign matter can be confirmed visually.

Other Embodiments

Although the above-described embodiment is an example of the preferred embodiments of the present invention, the present invention is not limited to this, but can be varyingly modified within the scope of the present invention.

In the above-described embodiment, the sealing member 8, the bottom face 30c of the seal arrangement groove 30 and the seal crushing portion 5h are formed such that the shape thereof when viewed from the front-back direction is a substantially semi-oval shape in which the upper end is wider in the left-right direction and the lower end is narrower in the left-right direction. Besides this, the sealing member 8, the bottom face 30c of the seal arrangement groove 30 and the seal crushing portion 5h may be formed such that the shape thereof when viewed from the front-back direction is a substantially oval shape or a substantially circular shape.

In the above-described embodiment, the sealing member 8 is formed such that the shape thereof when viewed from the front-back direction is a substantially semi-oval shape in which the upper end is wider in the left-right direction and the lower end is narrower in the left-right direction. Also, the cross-section of the sealing member 8 is formed in a substantially D-shape. In other words, in the above-described embodiment, the sealing member 8 is in a special shape different than other sealing members on the market. Beside this, the sealing member 8 may be a general sealing member such as an O-ring.

In the above-described embodiment, the seal arrangement groove 30 is created in the seal arrangement 18. However, the seal arrangement groove 30 may not be created in the seal arrangement 18. More specifically, the front wall 31 may not be formed at the seal arrangement 18.

In the above-described embodiment, the main body frame 6 is configured by the first frame 21 and the second frame 22 which are divisions in the left-right direction. Alternately, the main body frame 6 may be configured by two frames which are the divisions in the top-bottom direction or the front-back direction. Also, the main body frame 6 may be formed in a single unit.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

Reference Numerals

1 Card reader
2 Card
3 Magnetic head
4 Insertion slot
5 Anterior frame
5a Front face portion
5b Cylinder portion
5c Light-guiding portion 5g Display panel
5h Seal crushing portion
5k Inner circumferential face
6 Main body frame
7 Control board
8 Sealing member
9 Card detection mechanism
11 Sensor
12 Light-guiding member
13 Light source
15 Head arrangement
16 Card cage
17 Partition wall
18 Seal arrangement
21 First frame
21b first housing frame portion
21g Outer circumferential end wall
22 Second frame
22b Second cage frame portion
26 Joint portion
27 Groove (Sealing material filling groove)
30 Seal arrangement groove
30b Rear side wall face (End portion abutting surface)
30c Bottom face (Inner circumference abutting surface)
33 Through hole
34 Passing hole
37 Opening
X2 Card insertion direction (First direction)
Y Card thickness direction

What is claimed is:

1. A card reader having a magnetic head which abuts on a card to read magnetic information recorded on said card and/or write magnetic information on said card and mounted in a host device for use, comprising:
   an anterior frame in which an insertion slot for said card is formed;
   a main body frame fixed to said anterior frame;
   a control board to which said magnetic head is electrically connected; and
   a sealing member which is formed to be annular and is arranged between said anterior frame and said main body frame;
   wherein an insertion direction of said card is a first direction;
   wherein said main body frame is provided with:
      a head arrangement in which said magnetic head is arranged;
      a card cage which houses a first direction side of said card when the card is inserted into the insertion slot; and
      a seal arrangement which is formed between said head arrangement and said card cage, and in which said sealing member is positioned such that an inner circumference of said sealing member makes contact with the seal arrangement;
   wherein said anterior frame is provided with:
      a front face portion that forms an anterior of said card reader; and
      a substantially cylindrical cylinder portion which connects to said front face portion, and extends from said front face portion toward said first direction;
   wherein said head arrangement is positioned on the inner circumferential side of said cylinder portion;
   wherein said insertion slot is formed in said front face portion such that said card inserted from said insertion slot passes on the inner circumferential side of said cylinder portion;
   wherein a first direction end side portion of said cylinder portion is formed as a seal crushing portion that crushes said sealing member in a radial direction from an outer circumferential side of said sealing member;
   wherein said control board is arranged outside said card cage so as to be closer to said first direction side than said seal arrangement; and
   wherein an inner circumferential face of said seal crushing portion is formed in a tapered shape fanning out in a radial direction of said seal crushing portion as toward said first direction.

2. The card reader as set forth in claim 1;
   wherein the inner circumferential contact face of said seal arrangement, with which the inner circumference of said sealing member makes contact, is formed to be a convex surface that swells outwardly in the radial direction of the seal arrangement.

3. The card reader as set forth in claim 1;
   wherein an end portion contact surface, with which said first direction end of said sealing member makes contact, is formed on said first direction end side of said seal arrangement.

4. The card reader as set forth in claim 3;
   wherein a seal arrangement groove, in which said sealing member is arranged, is created in said seal arrangement.

5. The card reader as set forth in any of claim 1;
   wherein said main body frame includes a first frame and a second frame which are divisions in a thickness direction of said card;
   wherein said first frame is provided with a first cage frame portion that forms part of said card cage;
   wherein said second frame is provided with a second frame portion that, together with said first cage frame portion, forms said card cage; and
   wherein a sealing material is applied to a joint portion that joins said first cage frame portion and said second cage frame portion together to seal said joint portion.

6. The card reader as set forth in claim 5;
   wherein an outer circumferential end wail which stands upright in the thickness direction of said card is formed at an outer circumferential end of said first cage frame portion;
   wherein said first cage frame portion and said second cage frame portion are joined together under the condition where an outer circumferential end of said second cage frame portion is positioned on an inner circumferential face side of said outer circumferential end wall; and
   wherein a sealing material filling groove for filling said sealing material is formed along said outer circumferential end wall at an outer circumferential side portion of said first cage frame portion and said second cage frame portion which is said joint portion.

7. The card reader as set forth in any of claim 1;
   wherein passing holes, through which cables pulled out of said magnetic heads pass to be connected to said control board, are formed closer to an inner circumferential side of said seal arrangement than said sealing member; and
   wherein a sealing material is filled in said passing holes to seal said passing holes.

8. The card reader as set forth in any of claim 1;
   wherein a partition wall is formed between said card cage and said seal arrangement;
   wherein through holes are formed to said partition wall so that screws used to fasten said main body frame to said anterior frame pass through; and
   wherein said through holes are arranged radially outside said sealing member.

9. The card reader as set forth in any of claim 1;
wherein said front face portion is positioned in an opening portion formed in a front panel of said host device, forming part of said front panel;
wherein a display panel is formed in said front face portion to display the operation status of said card reader,;
wherein a light source is mounted on said control board; and
wherein, in said anterior frame, a light-guiding portion is formed radially outside said cylinder portion to guide light emitted from said light source to said display panel.

10. The card reader as set forth in any of claim 1;
wherein a card detection mechanism is provided to detect that said card is housed in said card cage;
wherein said card detection mechanism is provided with:
    an optical sensor having a light-emitting device and a light-receiving device; and
    a light-shielding member which intercepts light emitted from said light-emitting device to said light-receiving device; and
wherein said sensor is arranged outside said card cage and said light-shielding member is arranged inside said card cage.

11. The card reader as set forth in claim 10;
wherein said light-shielding member is formed by a flat spring.

12. The card reader as set forth in claim 10;
wherein said card cage is formed of a light-transmitting member which transmits light emitted from said light-emitting device.

13. The card reader as set forth in claim 1;
wherein said card cage is transparent or semi-transparent.

14. The card reader as set forth in claim 11,
wherein said card cage is formed of a light-transmitting member which transmits light emitted from said light-emitting device.

* * * * *